(12) United States Patent
Durak et al.

(10) Patent No.: US 11,722,292 B2
(45) Date of Patent: Aug. 8, 2023

(54) SYSTEM AND METHOD FOR IMPROVING THE EFFICIENCY OF ADVANCED ENCRYPTION STANDARD IN MULTI-PARTY COMPUTATION WITH PRECOMPUTED DATA

(71) Applicant: Robert Bosch GmbH, Stuttgart (DE)

(72) Inventors: Betül Durak, Pittsburgh, PA (US); Jorge Guajardo Merchan, Pittsburgh, PA (US)

(73) Assignee: Robert Bosch GMBH, Stuttgart (DE)

( * ) Notice: Subject to any disclaimer, the term of this patent is extended or adjusted under 35 U.S.C. 154(b) by 269 days.

(21) Appl. No.: 17/162,390

(22) Filed: Jan. 29, 2021

(65) Prior Publication Data
US 2022/0247552 A1    Aug. 4, 2022

(51) Int. Cl.
*H04L 9/06*    (2006.01)

(52) U.S. Cl.
CPC .......... *H04L 9/0631* (2013.01); *H04L 9/0637* (2013.01); *H04L 2209/04* (2013.01); *H04L 2209/46* (2013.01)

(58) Field of Classification Search
CPC . H04L 9/0631; H04L 9/0637; H04L 2209/04; H04L 2209/46; G06F 21/602
See application file for complete search history.

(56) References Cited

U.S. PATENT DOCUMENTS

| | | |
|---|---|---|
| 8,566,247 B1 | 10/2013 | Nagel |
| 9,425,961 B2 | 8/2016 | Susella |
| 10,158,485 B2 | 12/2018 | Satpathy et al. |
| 2006/0140401 A1 | 6/2006 | Johnson et al. |
| 2009/0003589 A1 | 1/2009 | Mathew et al. |
| 2017/0228547 A1* | 8/2017 | Smith .................... H04L 9/0819 |
| 2019/0372760 A1* | 12/2019 | Zheng ..................... H04L 9/085 |
| 2020/0228325 A1* | 7/2020 | Fan ......................... H04L 9/085 |
| 2021/0209247 A1* | 7/2021 | Mohassel .............. A63B 21/222 |

FOREIGN PATENT DOCUMENTS

| | | |
|---|---|---|
| CN | 106452726 A | 2/2017 |
| JP | 2005527853 A | 9/2005 |

OTHER PUBLICATIONS

F. Betul Durak and Jorge Guajardo, Improving the Efficiency of AES Protocols in Multi-Party Computation, 2021, International Financial Cryptography Association, pp. 1-20, (Year: 2021).*

(Continued)

*Primary Examiner* — Ellen Tran
(74) *Attorney, Agent, or Firm* — Dickinson Wright PLLC (57) ABSTRACT

A distributed computer network utilizing cryptography that includes one or more processors, wherein the one or more processors are programmed to receive a secret input state and one or more tuples, mask the secret input state with the one or more tuple and utilize a reveal to compute a masked input, compute six multiplications on the masked input, compute multiplication of two secret values to output an intermediate output, mask a third secret value from the intermediate output and reveal the third secret value to compute an interaction, compute a multiparty-computation multiplication with the interaction, and output a final secret value in response to computing the multiparty-computation multiplication.

19 Claims, 3 Drawing Sheets

(56) References Cited

OTHER PUBLICATIONS

The Advanced Encryption Standard, Nov. 26, 2001. FIPS PUB 197: Federal Information Processing Standard, 51 pages.

Ivan Damgård, Marcel Keller, Enrique Larraia, Christian Miles, and Nigel P. Smart. Implementing AES via an Actively/Covertly Secure Dishonest-Majority MPC Protocol. In Security and Cryptography for Networks—SCN 2012. Proceedings, vol. 7485 of LNCS, pp. 241-263. Springer, Sep. 5-7, 2012, 18 pages.

Ivan Damgård, Valerio Pastro, Nigel Smart, and Sarah Zakarias. Multiparty computation from somewhat homomorphic encryption. In Reihaneh Safavi-Naini and Ran Canetti, editors, Advances in Cryptology—Crypto 2012, pp. 643-662, Berlin, Heidelberg, 2012. Springer Berlin Heidelberg, 46 pages.

Marcel Keller, Emmanuela Orsini, Dragos Rotaru, Peter Scholl, Eduardo Soria-Vazquez, and Srinivas Vivek. Faster Secure Multi-party Computation of AES and DES Using Lookup Tables. In Applied Cryptography and Network Security—ACNS 2017. Proceedings, vol. 10355 of LNCS, pp. 229-249. Springer, Jul. 10-12, 2017, 26 pages.

Keller et al., "Faster Secure Multi-party Computation of AES and DES Using Lookup Tables," Applied Cyptography and Network Security, ACNS 2017, pp. 1-21.

Damgard et al., "Secure Multiparty AES," 2009, pp. 1-14.

Ahmad et al., "Chaotic Dynamic S-Boxes Based Substitution Approach for Digital Images," 2017, pp. 1-12.

\* cited by examiner

SYSTEM AND METHOD FOR IMPROVING THE EFFICIENCY OF ADVANCED ENCRYPTION STANDARD IN MULTI-PARTY COMPUTATION WITH PRECOMPUTED DATA

TECHNICAL FIELD

The present disclosure relates to security, such as cryptography. Furthermore, the disclosure may related to advanced encryption standard (AES) for cryptography.

BACKGROUND

Secure multi-party computation (MPC) is a field in cryptography which provides a method for many parties to jointly compute a function on a private input. In MPC, the parties obtain some "shares" of the input on which they want to compute the function. MPC may provide a way to keep the input private from the participants of MPC. Moreover, many companies use MPC to jointly compute some functions of their interest without disclosing their private inputs.

Since MPC may allow a system to "distribute" the trust among participants of the protocol, one very significant application of MPC may be to protect the long term secret keys securely. This may allow the companies to manage the secret, when, otherwise, it is very difficult to manage security of such keys. Thus, the secret key may be distributed among participants by splitting into shares such that the certain subset of participants can encrypt or decrypt the data when it is required by running the MPC protocol without revealing the key. One desirable encryption/decryption mechanism is the standard block cipher Advanced Encryption Standard (AES).

One of the most efficient MPC protocol is called SPDZ (Secure Multiparty Computation). SPDZ uses linear secret sharing method in order to share the function input in a private manner. Secret sharing algorithms could be seen as encryption methods from information theoretic point of view. The SPDZ approach also makes AES computations in an MPC setting possible.

AES may be a standard block cipher that is known in the art. AES's security and efficiency in standard systems has been approved given that it is a fast standard software and hardware implementation of AES where systems can encrypt/decrypt millions of 128 blocks per second. However, AES may not be particularly designed for MPC computations. Block cipher computations in MPC is less efficient than its plain implementations may be caused by the non-linear layers forming a round. For example, AES-128 may have 10 rounds each consisting of 16 Sbox computations, which correspond to the only layer of non-linear function in each round. Each Sbox acts on a byte of the 128-bit state. All other functions in each round are linear and therefore straight forward to implement in the MPC setting as they do not require interaction.

AES-128 inputs and output 128 bits and each layer and round operates with 128 bits. AES operations may be represented with two different circuit designs: Boolean circuits and algebraic circuits. Boolean circuit representation may compute all the operations with Boolean gates (AND and XOR) in bit level. Algebraic circuit representation may rely on an arithmetic structure which is called AES algebraic finite field or Galois field that defines the algebra in a byte level (input and all internal states will be considered as 16 bytes).

Among its four layers, the SubBytes layer may perform non-linear operations. The SubBytes (a.k.a. Sbox) layer may apply a permutation to each 16 bytes. There are more than one way to implement the Sbox permutation. At the end, implementing AES SubBytes means to apply 16 Sbox operations that represent the permutation. In MPC, the cost for the rest of the layers is negligible. Therefore, the disclosure below will discuss Sbox operation which is the only non-linear operation below.

MP-SPDZ may allow a system to implement functions in binary finite field (such as $GF(2^{40})$) as well as odd characteristic prime finite field (as in $Z_p$). Standard AES arithmetic may be defined with Galois field $GF(2^8)$ with a reduction modulus. Due to the statistical security, MP-SPDZ may allow computations in binary finite field $GF(2^{40})$. Therefore, AES implementation in MP-SPDZ as well in $GF(2^{40})$ instead of $GF(2^8)$. Thus, MP-SPDZ may need to define the field $GF(2^{40})$ with a reduction modulus and an embedding from $GF(2^8)$ elements to $GF(2^{40})$ elements (these elements form a sub-field of size $2^8$). The reduction modulus to define $GF(2^{40})$ may be $Q(X)=X^{40}+X^{20}+X^{15}+X^{10}+1$ and the embedding of Y in $GF(2^8)$ may be defined with $X^5+1$ in $GF(2^{40})$.

Additionally, SPDZ may work in either the offline or online model of computation in which the servers (sometimes referred to as parties) precompute data during an offline phase, which is typically implemented using expensive operations or schemes (such as for example, Fully Homomorphic Encryption with limited depth). The output of this phase may be called Beaver tupples which may be used during the online phase of computation. The effect of this model of computation is that the online phase is very fast compared to any other alternatives. The state-of-the-art has proposed tupples for various operations including multiplication, bit decomposition, matrix multiplications, and squaring operations. One of the purposes of this disclosure is to propose special SubBytes Tupples, which can be used to speed up the computation of the AES Subbytes transformation The present disclosure may be an application in any system that intends to encrypt data at rest or in traffic. For example, one could use the present embodiments by integrating it into a Transport Layer Security (TLS) session. Traditionally, TLS would consist of a first series of steps using public-key cryptography which are used to agree on a symmetric key to encrypt data at bulk. In contrast using the optimizations in this disclosure one can perform a first step using public-key cryptography, the output of which is a symmetric key, which in turn is distributed to the servers involved in the multi-party computation, which then may utilizes the embodiments including optimizations to encrypt or decrypt traffic in a distributed manner. Another application of the embodiments would simply involve a data storage service or secure distributed file system, which stores data at rest in encrypted form using the Advanced Encryption Standard (AES) and uses an embodiment to encrypt or decrypt data to be stored using a secret symmetric key distributed among the MPC servers.

SUMMARY

According to one embodiment, a distributed computer network utilizing cryptography that includes one or more processors, wherein the one or more processors are programmed to receive a secret input state and one or more tuples, mask the secret input state with the one or more tuple and utilize a reveal to compute a masked input, compute six multiplications on the masked input, compute multiplication of two secret values to output an intermediate output, mask a third secret value from the intermediate output and reveal the third secret value to compute an interaction, compute a multiparty-computation multiplication with the interaction, and output a secret value in response to computing the multiparty-computation multiplication.

According to a second embodiment, a non-transitory computer readable medium having stored thereon software instructions that, when executed by a processor, cause the processor to receive a secret input state and one or more tuples, mask the secret input state with the one or more tuple and utilize a reveal to compute a masked input, compute multiplication of two secret values to output an intermediate output, mask a third secret value from the intermediate output and reveal the third secret value to compute an interaction, compute a multiparty-computation multiplication with the interaction, and output a secret value in response to computing the multiparty-computation multiplication.

According to a third embodiment, a method of cryptography in a distributed computer network includes steps of receiving a secret input state and one or more tuples, masking the secret input state with the one or more tuples to compute a masked input, computing six multiplications on the masked input, computing multiplication of two secret values to output an intermediate output, masking a third secret value from the intermediate output and reveal the third secret value to compute an interaction, computing a multiparty-computation multiplication with the interaction, and a secret value in response to computing the multiparty-computation multiplication.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The disclosure below may detail two different systems and methods to implement AES (e.g., Sboxes) in MPC. One may utilize the arithmetic circuits (such as AES-BD), the second one may utilize table look-ups (such as AES-LT).

AES-BD may implement the Sbox with algebraic operations, namely it computes multiplications and linear transformations. AES-LT may utilize a table look up strategy to make computations very fast. However, they may require special data communicated and stored from the offline phase. As described above, the MP-SPDZ framework implements AES arithmetic in $GF(2^{40})$ by embedding all the elements of AES $GF(2^8)$ into $GF(2^{40})$. Thus, the system may apply embedding to the initial states and reverse the embedding after computations. Both embedding and reverse embedding may require bit decomposition and it may need to be done for full AES regardless of the method used for Sbox computations.

Figure 1:
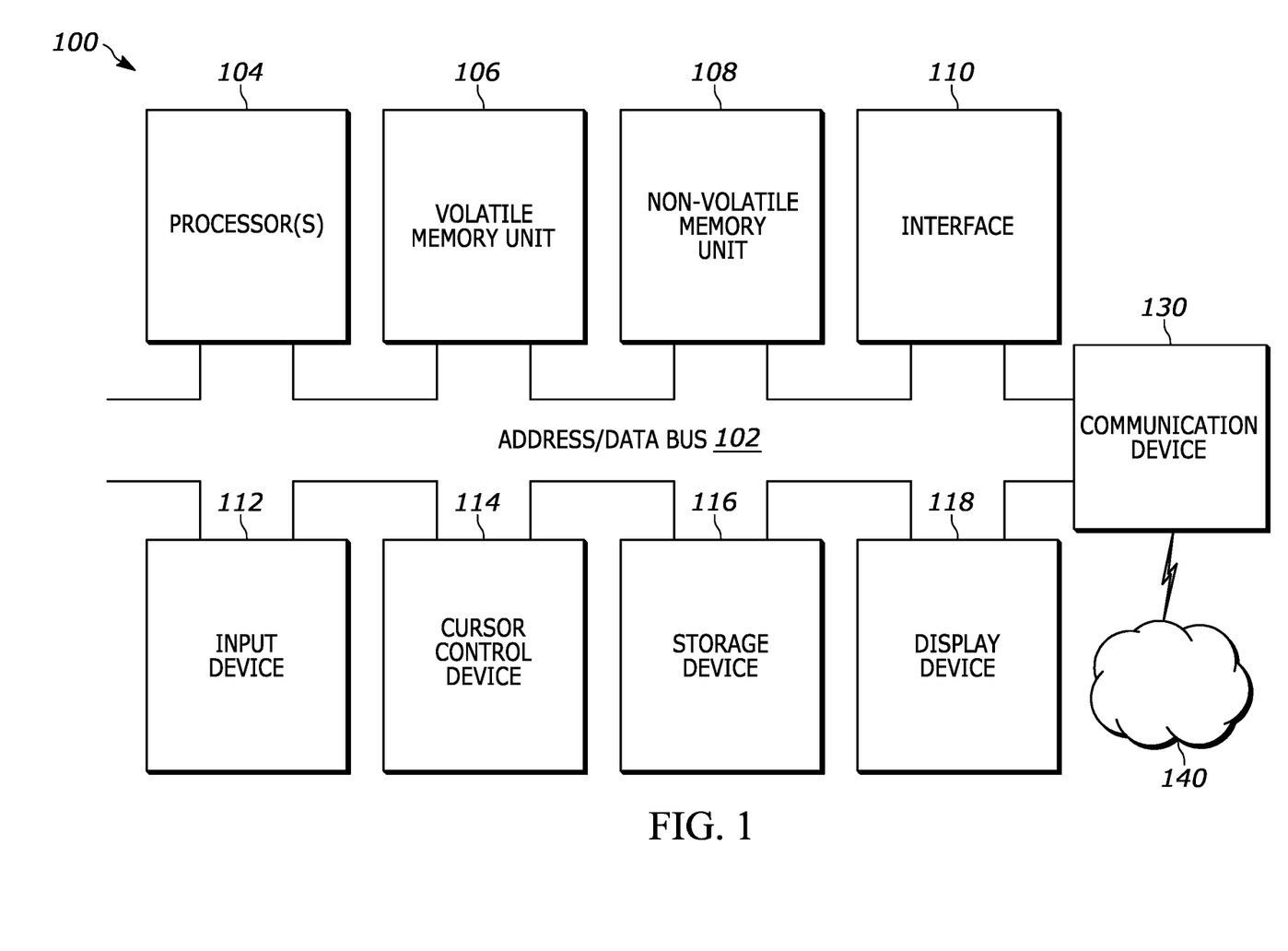
FIG. 1 discloses an embodiment of a distributed computer system.

FIG. 1 discloses an embodiment of a distributed computer system. The block diagram depicting an example of at least one computer in the system of the present disclosure is provided in FIG. 1. For example, when implemented in a network with multiple nodes, each node is an independent computer system that communicates with other nodes in the network. Thus, FIG. 1 provides a non-limiting example of at least one of those distributed computer systems 100. Note that the system and method as described herein can be implemented on servers in the cloud as well as desktops or any environment. The distributed computer system 100 may utilize a typical computer or, in other aspects, mobile devices as well as IoT devices (e.g., sensor network), or even a set of control computers on an airplane or other platform that uses the protocol (e.g., a multi-party computation protocol, etc.) for fault tolerance and cybersecurity purposes.

In various embodiments, distributed computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors and/or computers of the distributed computer system 100. When executed, the instructions cause the distributed computer system 100 to perform specific actions and exhibit specific behavior, such as described herein.

The distributed computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor or may be a controller. Alternatively, the processor 104 may be a different type of processor such as a parallel processor, application-specific integrated circuit (ASIC), programmable logic array (PLA), complex programmable logic device (CPLD), or a field programmable gate array (FPGA).

The distributed computer system 100 may be configured to utilize one or more data storage units. The distributed computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The distributed computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the distributed computer system 100 may execute instructions retrieved from an online data storage unit such as in "Cloud" computing. In an aspect, the distributed computer system 100 also may include one or more interfaces, such as an interface 110, coupled with the address/data bus 102. The one or more interfaces are configured to enable the distributed computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the distributed computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the distributed computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In one aspect, the distributed computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The distributed computer system 100 presented herein is an example computing environment in accordance with one aspect. However, the non-limiting example of the distributed computer system 100 is not strictly limited to being a distributed computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single or double data processing environment. Thus, in an aspect, one or more operations of various aspects of the present technology are controlled or implemented using computer-executable instructions, such as program modules, being executed by a computer or multiple computers. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

The distributed computing system 100 may include a communication device 130, such as a transceiver, to communicate with various devices and remote servers, such as those located on the cloud 140. The communication device 130 may communicate various data and information to allow for distributed processing of various data and information. Thus, multiple processors may be involved in computing operations. Furthermore, the communication device 130 may also communicate with other devices nearby, such as other computers (including those on the distributed network system), mobile devices, etc.

Figure 2:
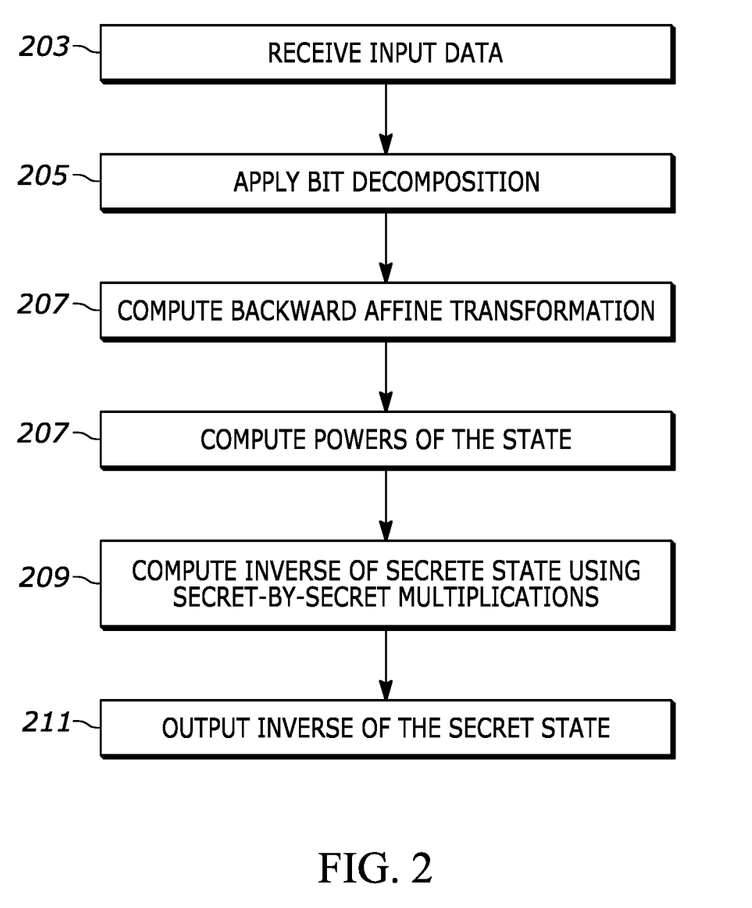
FIG. 2 shows an example flow chart of a single Sbox computation of inverse utilizing an AES-BD method.

FIG. 2 shows an example flow chart of a single Sbox computation of inverse utilizing an AES-BD method. AES, in general, may include 10 rounds for 128-bit keys. In one embodiment, the system may have 16 Sbox computations to make per round. Thus, there may be 160 computations in such an embodiment for AES-128 or $16*12=192$ computations for AES-192 or $16*14=224$ computations for AES-256. Depending on the method used, S-box computation may require certain operations which can be classified as 3 different types: (1) reveal used to make a secret value publicly available, (2) bit decomposition of embedded value (referred as BDEmbed), and (3) multiplication of two secret values (referred to as mult). Each of these atomic operations may be run with communication by using some storage (for auxiliary data which are computed in offline phase and stored before online phase). The storage may be any type of memory, hard drive, etc. One or more of the 16 SBox computations per round may be executed in parallel depending on the computing resources in the underlying computing platform.

With reference to reveal, it may not utilize any stored data. In theory, to reveal one secret $GF(2^{40})$ element, there will be a round trip communication of 10 bytes per operation.

With reference to BDEmbed, it may utilize a tuple ($<a_0>$, $<a_1>$, ..., $<a_7>$) where $<a_i>$'s are the decomposed bits of a random secret value a. Each bit $<a_i>$ needs 40 bits storage, therefore the tuple has 16*40 bits (each bit comes with 40-bit MAC) which makes 80 bytes. Communication is used to reveal a $GF(2^{40})$ element which is 10 bytes per operation as given in the previous function.

With reference to mult, it may utilize Beaver formula. Hence, the storage is a triplet of data, e.g., 30 bytes (3*80 bit) and communication is used to reveal two elements is 20 bytes per player and per operation.

The system may provide theoretical and practical requirements of these three functions in a table, such as that in Table 1 below.

Table 1 may utilize Storage (measured with triplets required) and communication requirements for three functions in theory (on the left) and running time and communication requirements in practice averaged over 100 runs (on the right). The reported figures below are per player, as shown in Table 1

TABLE 1

| theory | storage (bytes) | communication (bytes) | practice | running time (ms) | communication (bytes) |
|---|---|---|---|---|---|
| reveal | 0 | 10 | reveal | 0.0015 | 9.16 |
| BDEmbed | 80 | 10 | BDEmbed | 0.0061 | 9.16 |
| mult | 30 | 20 | mult | 0.0017 | 17.6 |

For the Sbox computations, the system may categorize the operations done in the offline phase and in the online phase separately. For the offline operations, the system may wish to determine the communication complexity required to generate what is needed in the online phase. The offline phase may require all the prepared data to be communicated to the participants before the online phase.

For the online operations, there may be three aspects to focus on: (1) computation complexity (which increases as the communication requirement or number of operations increase); (2) the data storage communicated from the offline phase before and consumed during the online phase; (3) the communication complexity which may be separated in two parts: (a) volume of data exchange and (b) the number of round trips. The system may conduct the separate because it may be very crucial for the compiler to understand that transmitting 1 MByte of data in one round trip will be much better than transmitting 10 KBytes of data with 100 rounds.

Note that storage can be measured as a single unit, such as in terms of bytes. On the other hand, communication can be measured either with the number of round trips or with the volume of the communication. In practice, it is important to distinguish these two because for each round trip, there is an overhead in the communication (such as TCP/IP header, etc.) regardless of the data volume. In practice, transmitting 1 GByte of data in one round trip may be much better than transmitting 10 KBytes of data each with 1000 round trips. In fact, how the compiler is implemented is very crucial for such calculations and points. It is because optimizing the round trips can be done very smartly. One example is the consecutive and independent operations. If a compiler understands that it needs to execute a bit decomposition for several times independently, it can use one single round trip to combine all the volume of data to communicate. If not done efficiently by the compiler, the system may still execute this optimization in the implementation to help the compiler. In theory, however, the system may report the number of round trips for precise comparison as well as the volume of communication. In one embodiment, it may be beneficial for the programmer to optimize the round trip communications carefully as it has significant impact on efficient running time.

The analysis below shows the storage, round trip and volume of communication complexity for full AES by multiplying the complexities for a single Sbox by 160 (there are 16 Sbox computations per round and there are 10 rounds in AES-128, hence 16*10=160). However, in other embodiments, AES can be implemented with 16 parallel communications for independent Sbox computations (all internal states go through Sboxes independently), hence using 10 times less round-trip. Such parallelism will not change the storage or the volume of data to transmit.

The protocol descriptions may be related to the Sbox computation. Thus, the rest of the computations for other layers may have minimal or no efficiency bottleneck to implement the linear layers, such as ShiftRows, MixColumns, AddRoundKey. The method may utilize AES-BD Arithmetic Circuits. Such a method may utilize the fact that the Sbox evaluation of a secret state $[\![ s ]\!]$ first computes the inverse of the secret, $[\![ s^{-1} ]\!]$ which is equal to computing $[\![ s^{254} ]\!]$ in AES finite field arithmetic, and some affine transformation as given in the official AES standard. For the computation of inverse of a secret state $[\![ s ]\!]$, AES-BD method observes two specific facts: (1) that $[\![ s^{254} ]\!]$ can be computed with exponents which are powers of two:

$[\![ s^{254} ]\!] = ([\![ s^2 ]\!] * [\![ s^4 ]\!] * [\![ s ]\!] * [\![ s^8 ]\!] * [\![ s^{16} ]\!] * [\![ s^{32} ]\!] * [\![ s^{64} ]\!] * [\![ s^{128} ]\!]$ and (2) that to compute the exponentiation with powers of two is a linear operation on the bits of secret $[\![ s ]\!]$ in AES finite field. Hence, to generate these 7 powers, AES-BD may apply 7 linear transformations.

Algorithm 1 may describe a full version of an Sbox computation on an input s in AES-BD. In step 1, the bit decomposition to the secret state is applied. Step 2 computes the powers with linear transformations operating on bits. Step 3 computes $s^{254}$ using 6 secret by secret multiplications. The output from Step 3 is actually a composite $GF(2^{40})$ value even though the input is a bit decomposition of secret s. To continue the operations, another bit decomposition may be required. Step 4 may apply to the second bit decomposition where it is used in the affine transformation in Step 5. The output from Step 5 is bit decomposed value, thus, the system may compose it back to a $GF(2^{40})$ element. Note that all the steps may include computations in embedded domain with the $GF(2^{40})$ elements.

---

Algorithm 1 One Sbox computation of forward AES-BD method

Require: A secret input as state $<si> \in GF(2^{40})$
Ensure: Computes <Sbox(s)>
1: Apply bit decomposition on $<s> = [<s_0>, <s_1>,..., <s_7>]$
2: Compute $\{<s^2>,<s^4>,<s^8>,<s^{16}>,<s^{32}>,<s^{64}>,<s^{128}>\}$ with linear transformation using $[<s_0>,<s_1>, ... , <s_7>]$
3: Compute $<y> = <s^{254}> = ((<s^2> * <s^4>) * (<s^8> * <s^{16}>)) * ((<s^{32}> * <s^{64}>) * <s^{128}>)$ with 6 secret by secret multiplications
4: Apply bit decomposition on $<y>$ as $[<y_0>,<y_1>,..., <y_7>]$
5: Apply Sbox affine transformation to compute the output bits $[<x_0>,<x_1>,... ,<x_7>]$
6: Compose $<x>$ from its bits
7: return $<s>$

---

The method may also include an offline phase. The system may need to generate 16 random bits and 6 triplets for one Sbox. It is 2560 random bits and 960 triplets for the full AES. An online phase may also be utilized. The storage utilized in the online phase may be used for the triplets may need for secret multiplications and bits in bit decomposition. Since there are 6 multiplications per Sbox, the system may store 6*30 bytes for the multiplication. Moreover, the system may need to store 160 bytes due to two bit decomposition (please refer to Table 1). For a single Sbox, the protocol stores 340 bytes. For the full AES, it stores 54.4 Kbytes per player. One Sbox operation in AES-BD may require 5 round-trip communication. One full AES block may require 800 round trips. Among 5 round trip communication, 2 consumes 10 bytes each and 3 round trips consume 120 bytes (120=20*3+20*2+20*1). In total, 140 bytes communication may be utilized per Sbox. For full AES, data communication may be 140*160 bytes=20.8 KBytes.

When AES is computed with a table look up under no-MPC computations, the table representing the Sbox permutation may be publicly available. Such look-ups happen securely by the key owner who may have knowledge of all the internal states. On the other hand, in MPC, the internal states as well as the secret key are secrets which are distributed among participants. Therefore, to look up a secret state on a publicly available table may not work. The idea that AES-LT uses is to generate a pair (x, MaskedTable) in the offline phase and distribute it as secret shares to each participant: (⟦ x ⟧, ⟦ MaskedTable ⟧). The pair indicates that MaskedTable is generated corresponding to a random secret x∈GF($2^{40}$). After the pair is shared as (⟦ x ⟧, ⟦ MaskedTable ⟧), the secret state to look up from the table is masked with x and revealed. Therefore, MPC changes the method from looking up a public table with a secret internal state into looking up a secret table with a public (masked) internal state.

The Sbox computation may require one pair (⟦ x ⟧, ⟦ MaskedTable ⟧). Even though an online phase of AES-LT may be faster than other methods, it may require more data to be communicated and stored from the offline phase. Algorithm 2 provides the online computations of a single Sbox in AES-LT, as shown below:

---
Algorithm 2 One Sbox computation of AES-LT method
---
Require: A secret input as state <s> ∈ GF($2^{40}$), one pair (<x>, <MaskedTable>)
Ensure: Computes <T[s]>i, where T is the public Sbox table
1: The parties compute h = x ⊕ s and reveals h
2: The parties locally compute <T[s]> = <MaskedTable>[h] where <MaskedTable>[h] means the $h^{th}$ component of <MaskedTable>
3: return <T[s] >
---

During an offline phase, the system may need to prepare 160 Maskedtable for a block of AES that requires 48 KBytes of communication during the offline phase. In one embodiment, communicating 160 tables to the online phase, the method may require 410 KBytes of communication per participant.

During an online phase, the system may need to store certain amount of data, make round trips and communication. The protocol of the system may need, per Sbox/SubBytes operation, one masked table. Each table may have 256 entries of GF($2^{40}$) elements. For example, one table is formed with 2.56 KBytes and 410 KBytes storage may be required for each participant in one block of AES. Per Sbox, the system may need one round trip communication between players for reveal. For a full block AES, it may need 160 round trips. Per Sbox, the communication is used may be during one reveal operation. Thus, 1600 bytes of communication needed in total for full block of AES.

The system may compute the round trip time of full AES block by multiplying single Sbox round trip requirement with 160. In various embodiments, such a process can be optimized. However, for one round of AES, 16 independent Sboxes may be computed. If the system can make the compiler merge round trips for independent Sboxes to the same trip, then it would be enough to count the round trip times by multiplying with 10. The system may conduct one round trip for all 16 Sboxes in each round of AES.

TABLE 2

Storage, round trip and communication requirements for a full block of AES with three methods

| estimated overhead | storage (KBytes) | round trip | communication (KBytes) | implementation | running time (ms) | communication (KBytes) |
|---|---|---|---|---|---|---|
| AES-LT | 410 | 160 | 1.6 | AES-LT | 0.80 | 3.13 |
| AES-BD | 54.4 | 800 | 20.4 | AES-BD | 5.026 | 18.37 |

FIG. 2 shows an example flow chart of a single Sbox computation of inverse utilizing an AES-BD method. FIG. 2 may provide details regarding an embodiment and description of protocols that the system may propose as a new set of mode of operation. To start with, in Algorithm 3 described below, the system may disclose that the inverse Sbox computation in inverse AES in one embodiment. At 203, the system may receive input data. In Step 1 of the algorithm and step 205 of the flow chart, the system may apply the bit decomposition on the embedded input state for once and all. The bit composition may be important to compute the backward affine transformation as operated in Step 2 of the algorithm and step 207 of the flow chart. The output from Step 2 may still be the bit decomposed values, thus the system can compute the powers of the state in Step 3 and step 207 of the flow chart by using 7 linear transformations. The output from Step 3 may now be composed values in GF($2^{40}$). Therefore, to compute the $254^{th}$ power (for example, the inverse of the secret state), the system may apply 6 secret by secret multiplications from the output of Step 3 without applying another bit decomposition, as shown in step 209. This operation may allow the system to save 1-bit decomposition operation, which may lead to increase efficiencies in processing. At step 211, the system may output the inverse of the secret state. Algorithm 3 is described below:

---
Algorithm 3 Single Sbox computation of inverse AES-BD method
---
Require: A secret input state <x> ∈ GF($2^{40}$)
Ensure: Computes <Sbox$^{-1}$(x)>
1: Apply bit decomposition on <x> = [<x$_0$>,<x$_1$>,... , <x$_7$>]
2: Apply backward Sbox affine transformation to compute the output bits [<s$_0$>,<s$_1$>,... ,<s$_7$>] (that forms <s> from the bits of <x>)
3: Compute {<s$^2$>,<s$^4$>,<s$^8$>,<s$^{16}$>,<s$^{32}$>,<s$^{64}$>,<s$^{128}$>} with linear transformation using [<s$_0$>,<s$_1$>,... , <s$_7$>] which form the <s>
4: Compute <s$^{254}$> = <b> = ((<s$^2$> * <s$^4$>) * (<s$^8$> * <s$^{16}$>)) * ((<s$^{32}$> * <s$^{64}$>) * <s$^{128}$>) with 6 secret by secret multiplications
5: return <b>
---

One of the differences between Algorithm 1 and Algorithm 3 comes from the fact that when the system reversed the order of computations, the system can do them with one single bit decomposition at the beginning in Algorithm 3 (Step 1). In forward AES, the system may first compute the inverse of the input (Step 3 in Algorithm 1) which is a composed value. Therefore, the system have to apply one more bit decomposition (Step 4 in Algorithm 1) to compute the forward Sbox affine transformation. Therefore, inverse AES can save 1.6 KBytes of data, as well as one less bit decomposition in computations to increase efficiencies in processing.

By applying one less bit decomposition, the system may save both computation and communication complexity. However, the system may observe that linear operations can be integrated together to improve the computational complexity further. Indeed, a system may implement the protocol in Algorithm 3 by using the integration of some steps. More specifically, the system may integrate the computations in Step 2 and 3 into a pre-computed variables. The system may generate such pre-computed values once for all Sbox (e.g., substitution-box computations and then as well execute the multiplication (given in Step 4) with the pre-computed values by skipping Step 2 and Step 3. The only reason this works is that Steps 2 and 3 are the affine and linear transformations which operate one after another. This gives us a significant advantage in terms of computation complexity. As shown below, the system may compare the forward AES and inverse AES with merge as given in Algorithm 4 (as well as further optimized protocol of storage and communication as given in Algorithm 6) in Algorithm Table 3. The forward AES may be sped up by a factor of 3 for its inverse utilizing Algorithm 3.

The performance of the system and method described in Algorithm 3 and the FIG. 2 above is optimized. For a secret states, computing the Sbox of this state is Sbox(s)=$M_{fwd}$ $(s^{254})+C_{fwd}$, where $M_{fwd}$ is a public matrix of bits, $C_{fwd}$ is a public vector of bits and $s^{254}$ is represented with bits. $M_{fwd}$ and $C_{fwd}$ are provided in the description. The inverse power 254 is computed with a list of powers=[2,4,8,16,32,64,128]. This may be shown below:

$$Sbox([\![s]\!]) = \prod_{i=0}^{6} [M_{fwd}([\![s]\!])]^{powers[i]} + C_{fwd}$$

$$= [M_{fwd}([\![s]\!])]^{powers[0]} * \ldots * [M_{fwd}([\![s]\!])]^{powers[6]} + C_{fwd}$$

$$[\![x]\!] = [M_{fwd}([\![s]\!])]^{254} + C_{fwd}$$

Note that the swapping of the power outside the matrix operation is due to the linearity.

The system may also compute Inverse Sbox in $GF(2^8)$. For a secret state x, $Sbox^{-1}(x=)=M_{bwd}((x+C_{fwd})^{254})$, where $M_{bwd}$ is the backward matrix to compute inverse Sbox. The computations follow the steps:

$$Sbox^{-1}([\![x]\!]) = [M_{bwd}([\![x]\!]+C_{fwd})]^{254}$$

$$[\![s]\!] = \Pi_{i=0}^{6}[M_{bwd}([\![x]\!]+C_{fwd})]^{power[i]}$$

The system may compute inverse Sbox in $GF(2^{40})$ for an embedded secret input byte [embed_byte]. Before describing the method, it may be beneficial to describe and introduce a few functions that may be utilized:

(1) ApplyBDEmbed is a function that may take a vector of 8 bits which represents a value in $GF(2^8)$ and returns the embedding (in $GF(2^{40})$) of composed input bits.

(2) BDEmbed is a function that may take a composite value in $GF(2^{40})$ and returns the 8 bits of this embedded value for the position {0,5,10,15,20, 25,30,35}.

For an input $[\![x]\!]$, BDEmbed outputs $[\![y_0]\!], \ldots, [\![y_7]\!]$ such that $[\![x]\!]=\Sigma_{i=0}^{7}[\![y_i]\!]*(0x20)^i$. This is due to the fact that the embedding in MP-SPDZ works with a special reduction modulus $Q(X)=X^{40}+X^{20}+X^{15}+X^{10}+1$. Utilizing this representation, any element of $GF(2^{40})$ is a linear transformation of its bits with the powers of (0x20). Thus, it is enough to return the bits with indices of multiple of five on the positions of {0,5,10,15,20,25,30,35}.

(3) InverseBDEmbed is a function that takes a composite value in $GF(2^{40})$ and returns the bits of its unembedded corresponding value in $GF(2^8)$.

To understand the difference between BDEmbed and InverseBDEmbed, utilize an example that lets x=(0x02) be a byte in $GF(2^8)$. x may be embedded into y=0x21 in $GF(2^{40})$ because of the chosen isomorphism between these two fields. When the system utilizes input embedded value y into BDEmbed, the output is [1,1,0,0,0,0,0,0] which represents 8 bits where only the $0^{th}$ and $5^{th}$ bits are set to 1 and $10^{th}, \ldots, 35^{th}$ bits set to 0. The system may use this function to take 8-bits of embedded value and pack it into one by only returning the left-most-bit of the packed bits. Indeed, 0x21 in $GF(2^{40})$ has only those bits set to 1. On the other hand, wheny is input to InverseBDEmbed, the output is [0,1,0,0,0,0,0,0] which is the binary representations (bit decomposition) of unembedded y, e.g., x=0x02.

For the full algorithm, the system can take the computations given in Equation 2 and transform all the steps in embedded format. An example of a full algorithm is given in Algorithm 4. In Step 1, the system may add the embedded input $[\![$ embed_byte $]\!]$ to $C_{fwd}$ after embedding $C_{fwd}$. The output is called $[\![x]\!]$. In Step 2, the system may bit decompose $[\![x]\!]$ and obtain a vector $[\![y]\!]$. Step 3-5 may merge the following operations: first, $[\![y]\!]$ goes through the affine transformation with matrix $M_{bwd}$ where the matrix $M_{bwd}$ is multiplied with vector $[\![y]\!]$, the result is $[\![s]\!]$. The output $[\![s]\!]$ may be a vector of bits. Then, it computes $[\![s^2]\!], \ldots, [\![s^{128}]\!]$ with another linear transformation. These steps are merged with the help of a table named magic. The table magic may include computations that provide an explanation as to why Steps 3-5 works.

$$[\![s]\!] = M_{bwd}([\![x]\!])$$

$$= M_{bwd}\left(\sum_{i=0}^{7}[\![y_i]\!]*(0x20)^i\right)$$

$$= M_{bwd}([\![y_0]\!]*(0x20)^0 + \ldots + [\![y_7]\!]*(0x20)^7)$$

$$= [\![y_0]\!]*M_{bwd}((0x20)^0) + \ldots + [\![y_7]\!]*M_{bwd}((0x20)^7)$$

The last part of the equation is due to the linearity of the operations. Since $[\![y_i]\!]$'s are bits, the bits can be taken out and all thus the system may be left to compute the affine transformation of the powers of (0x20) by multiplying with $M_{bwd}$ in an unembedded domain. This is shown in steps 3-4 of Algorithm 5. The rest of the steps in Algorithm 5 is to merge the linear transformations to compute the powers of two of $[\![s]\!]$. Essentially, this entire procedure in Algorithm 5 will be used in Step 3 of Algorithm 4. The system may implicitly apply 7 linear transformations($L_0, \ldots L_6$) to compute $M_{bwd}([\![y]\!]C_{bwd})^{powers[i]}\forall i \in \{0, \ldots, 6\}$ in the vector mapper from a predefined table called magic. An example description of how to compute the table magic is given in Algorithm 5, shown further down below.

Algorithm 4 Optimized Single Sbox Implementation of Algorithm 3

Require: A secret input state <embed_byte> ∈ $GF(2^{40})$
Ensure: Computes <$Sbox^{-1}$(embed_byte) >
1: Compute <x> = embed_byte + ApplyBDEmbed ($C_{fwd}$)
2: <y> = BDEmbed(<x>)
3: for i ∈ {0, . . . 6} do 4: $\quad mapper[i] = \sum_{j=0}^{7} (magic[i][j] * \langle y_j \rangle)$ ▷ mapper = [⟨$s^2$⟩, . . . , ⟨$s^{128}$⟩]

5: end for
6: Compute <$S^{254}$> = ((mapper[0] * mapper[1]) * ⋯ * mapper[6])
7: return <$S^{254}$>

Below is an embodiment of a further optimization technique for inverse AES protocol given in Algorithm 4. The embodiment focuses on the SubBytes layer. Such a technique may require special tuples computed in the offline phase.

Algorithm 5 Computation of magic once for all AES decryption.

Require: Public matrix $M_{bwd}$ and public vector $C_{fwd}$
Ensure: Computes a predefined table magic
1: for i ∈ {0,... 6} do
2:   for j ∈ {0,... 7} do
3:     A = InverseBDEmbed($0x20^j$)   ▷ return a vector of 8 bits
4:     B = $M_{bwd}$ * A   ▷ matrix*vector multiplication
5:     C = ApplyBDEmbed(B)   ▷ Composes embedded value from its bits
6:     D = $C^{powers[i]}$   ▷ powers = [2, 4, 8, 16, 32, 64, 128]
7:     magic[i][j] = D
8:   end for
9: end for
10: return magic The idea of such an optimization comes from the fact that when the finite field is binary, then the bit decomposition turns out to be a linear operation (as opposed to finite fields with (odd) prime characteristics). This gives us the opportunity to start the integration of steps from the beginning where the bit decomposition is performed. Algorithm 6 is shown below:

Algorithm 6 Storage and Communication Optimizations of Algorithm 4

Require: A secret input state <embed_byte> ∈ $GF(2^{40})$
Ensure: Computes <$Sbox^{-1}$(embed_byte)>
1. Receive a tuple with 13 secret $GF(2^{40})$ values from the offline phase: T = (⟨a⟩, ⟨$L_0(a)$⟩, . . . , ⟨$L_6(a)$⟩, ⟨$L_0(a) * L_1(a)$⟩, ⟨$L_2(a) * L_3(a)$⟩, ⟨$L_4(a) * L_5(a)$⟩, ⟨b⟩, ⟨b * $L_6(a)$⟩)
2: Compute ⟨y⟩ = ⟨x⟩ + ⟨a⟩ and reveal y.
3: Compute $L_0(y), \ldots, L_6(y)$, A = $L_0(y) * L_1(y)$, B = $L_2(y) * L_3(y)$, C = $L_4(y) * L_5(y)$
4: Compute ⟨$L_0(x) * L_1(x)$⟩ as follows:
  ⟨$L_0(x) * L_1(x)$⟩ = A + $L_1(y) * \langle L_0(a) \rangle + L_0(y) * \langle L_1(a) \rangle + \langle L_0(a) * L_1(a) \rangle$
5: Compute ⟨$L_2(x) * L_3(x)$⟩ as
  ⟨$L_2(x) * L_3(x)$⟩ = B + $L_3(y) * \langle L_2(a) \rangle + L_2(y) * \langle L_3(a) \rangle + \langle L_2(a) * L_3(a) \rangle$
6: Compute ⟨$L_4(x) * L_5(x)$⟩ as
  ⟨$L_4(x) * L_5(x)$⟩ = B + $L_5(y) * \langle L_4(a) \rangle + L_4(y) * \langle L_5(a) \rangle + \langle L_4(a) * L_5(a) \rangle$
7: Compute ⟨$L_0(x) * L_1(x) * L_2(x) * L_3(x)$⟩
8: Compute ⟨U⟩ = ⟨$L_4(x) * L_5(x)$⟩ + ⟨b⟩ and reveal U.
9: Compute V = $L_6(y)$,[5] and ⟨$L_4(x) * L_5(x) * L_6(x)$⟩ as follows:
  U * V + ⟨b⟩ * V + ⟨$L_6(a)$⟩ * U + ⟨b * $L_6(a)$⟩
10: Compute the full product ⟨X⟩⟨$L_0(x) * \ldots * L_6(x)$⟩
11: return ⟨X⟩

Algorithm 6 may assume the availability of special tuples from pre-processing phase: T=(<a>, <$L_0(a)$>, . . . , <$L_6(a)$>, <$L_0(a)*L_1(a)$>, <$L_2(a)*L_3(a)$>, <$L_4(a)*L_5(a)$>,<b>, <b*$L_6$(a)>). Each of these tuples are computed from two random values, a and b. The linear functions $L_0(a), L_1(a), \ldots, L_6(a)$ computes the powers of a: $a^{2^1}, a^{2^2}, a^{2^3}, a^{2^4}, a^{2^5}, a^{2^6}, a^{2^7}$. The underlying homomorphic encryption to preparing such tuples requires performing squaring operation. Squaring comes with negligible cost for the pre-processing phase.

Figure 3:
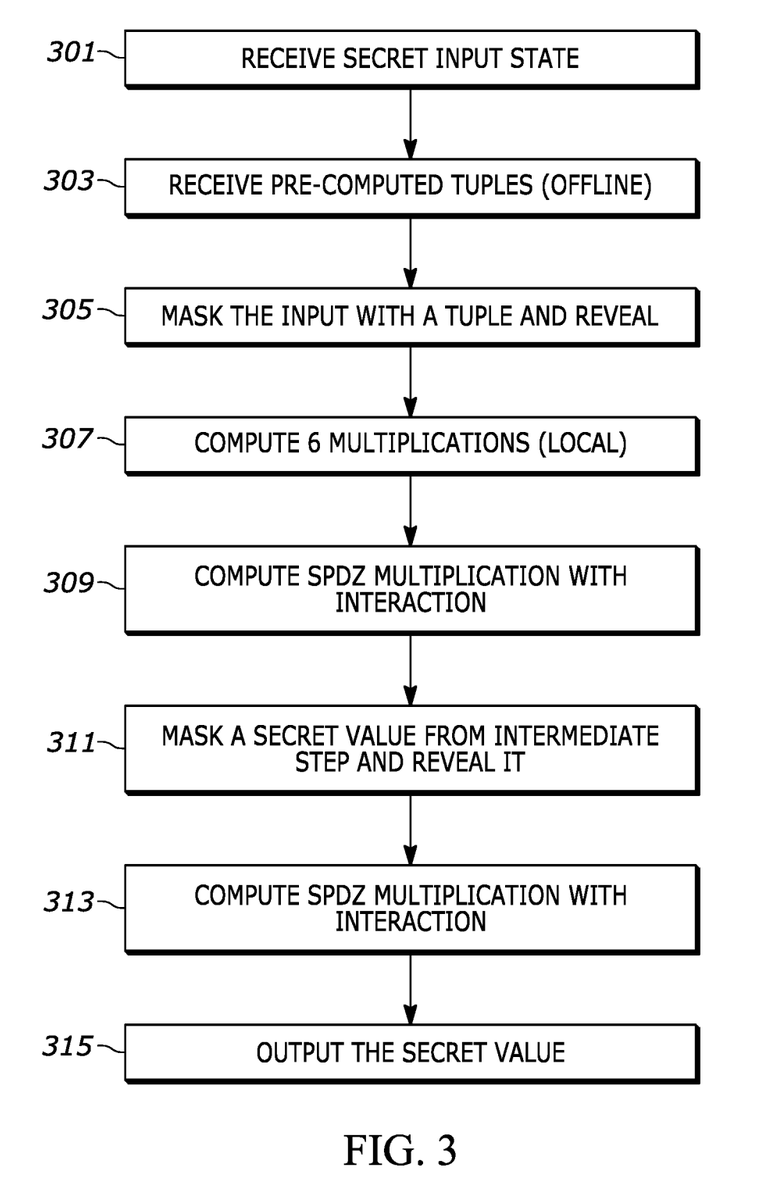
FIG. 3 shows an example flow chart of another embodiment of a Sbox computation for an inverse AES protocol.

FIG. 3 shows an example flow chart of another embodiment of a Sbox computation for an inverse AES protocol. At step 301 of the flow chart, the system may receive a secret input state. At step 303, the system may also receive a pre-computed tuple, which may precomputed during the offline phase. In Step 1 of Algorithm 6, it may be observed that there are 13 secret $GF(2^{40})$ elements. This may correspond to 130 bytes of data that needs to be stored from an offline phase. In one embodiment, no more than 130 bytes of data may need to be stored, thus this may include zero bytes, one byte, and up to 130 bytes. At step 305 and step 2 of the algorithm, the system may operate utilizing one reveal, which adds 1 round-trip and 10 bytes of communication to the complexity. Thus, this may cause the input to be masked. This step may allow the system and method to remove a bit decomposition on a secret value. Thus, the system can perform it on clear value y now. Step 3, 4, 5, and 6 of Algorithm 6 may be all local computations, thus there may be no communication required between servers. However, some of the only costs may be associated with computation complexity done locally. At step 307, the system may compute 6 multiplications. At step 309 and Step 7 of the algorithm may be multiplication of two secret values (which is the unaltered SPDZ multiplication protocol). Step 9 is a special multiplication which requires only 1 reveal (10 bytes and 1 round-trip) as revealed in Step 8. More specifically, the system may multiply $<L_4(x)*L_5(x)>$ by $<L_6(x)>$. The system may consider the multiplication with Beaver triplets. At step 311, the system may let $<L_4(x)*L_5(x)>$ be masked with a secret $<b>$ where the system may have it from offline tuples (Step 1); thus $L_4(x)*L_5(x)+b$ is revealed. $L_6(x)$ may be masked with $L_6(a)$ where $<L_6(x)>+<L_6(a)>$ is already revealed. Finally, the system may use the product of these two masks, $<b*L_6(a)>$ in Step 1. Step 313 of the flow chart and step 10 of the algorithm is a normal SPDZ multiplication which requires 2 reveals (20 bytes and 2 round-trips). At step 315 of the flow chart, the system may output the secret value.

Therefore, for a single Sbox computation of the complete optimization utilizing Algorithm 6 may cost 130 bytes of storage, 6 round-trips, and 60 bytes of communication, as opposed to 260 bytes storage, 13 round-trips, and 130 bytes of communication in comparison to Algorithm 4. The system may be implemented in full AES as given in Algorithm Table 3. Indeed, the communication and storage requirement for Algorithm 6 may be half less than Algorithm 4.

In comparison to Algorithm 6 with AES-LT, it can be exemplified that the storage for AES-LT is 20 times more than the protocols need though the running time of AES-LT is twice faster and communication requirement is five times less. However, the system may need to communicate the storage data to run the offline phase. Therefore, such an improvement may be significant.

TABLE 3

Storage, round trip and communication requirements for a full block of inverse AES compared with forward AES:

| estimated overhead | storage (KBytes) | round trip | comm (KBytes) | imple- mentation | running time (ms) | comm (KBytes) |
| --- | --- | --- | --- | --- | --- | --- |
| AES-BD Algorithm 1 | 54.4 | 800 | 20.4 | AES-BD Algorithm 1 | 5.026 | 18.37 |
| Algorithm 4 | 41.6 | 640 | 18.8 | Algorithm 4 | 1.642 | 17.21 |
| Algorithm 6 | 20.8 | 260 | 9.6 | Algorithm 6 | 1.501 | 8.20 |

The systems and methods described above may be utilized for a number of beneficial reasons. For example, such embodiments may lead to storage reduction in various computers and servers. Likewise, the embodiments may lead to less energy consumption on processors performing such calculations. Furthermore, the embodiments may lead to memory reduction in various computers and servers utilizing such cryptography. Thus, there are a number of technological benefits for such.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A distributed computer network utilizing cryptography, comprising:
   one or more processors, wherein the one or more processors are programmed to:
   receive a secret input state and one or more tuples from received data, wherein the tuples indicate a sequence of decomposed bits and pre-computed during an offline phase;
   mask the secret input state with the one or more tuples and utilize a reveal to compute a masked input;
   compute six multiplications on the masked input;
   compute multiplication of two secret values to output an intermediate output;
   mask a third secret value from the intermediate output and reveal the third secret value to compute an interaction;
   compute a multiparty-computation multiplication with the interaction; and
   output a final secret value of the data in response to computing the multiparty-computation multiplication.

2. The distributed computer network of claim 1, wherein the one or more tuples are pre-computed offline.

3. The distributed computer network of claim 2, wherein the one or more pre-computed tuples includes 13 secret Galois Field elements.

4. The distributed computer network of claim 1, wherein the masked input removes a bit decomposition on a first secret value in response to masking the secret input state.

5. The distributed computer network of claim 1, wherein the one or more processors are located on one or more servers.

6. The distributed computer network of claim 1, wherein the processor is programmed to perform inverse advanced encryption standard cryptography.

7. The distributed computer network of claim 1, wherein the processor is programmed to utilize the reveal to compute the masked input during an offline phase.

8. The distributed computer network of claim 1, wherein the output of the final secret value utilizes no more than 130 bytes of storage.

9. A non-transitory computer readable medium having stored thereon software instructions that, when executed by a plurality of processors, cause the processors to:
receive a secret input state and one or more tuples from received data, wherein the one or more tuples indicate a sequence of decomposed bits, wherein the one or more tuples are computed offline;
mask the secret input state with the one or more tuples and utilize a reveal to compute a masked input;
compute multiplication of two secret values to output an intermediate output;
mask a third secret value from the intermediate output and reveal the third secret value to compute an interaction;
compute a multiparty-computation multiplication with the interaction; and
output a final secret value of the data in response to computing the multiparty-computation multiplication.

10. The non-transitory computer readable medium of claim 9, wherein the output of the secret value utilizes no more than 130 bytes of storage.

11. The non-transitory computer readable medium of claim 9, wherein the output of the secret value utilizes 13 round trips.

12. The non-transitory computer readable medium of claim 9, wherein the output of the secret value utilizes no more than 130 bytes of communication.

13. The non-transitory computer readable medium of claim 9, wherein the instructions cause the processor to perform a symmetric mode of operation.

14. The non-transitory computer readable medium of claim 9, wherein the instructions cause the processor to compute six multiplications on the masked input.

15. A method of cryptography in a distributed computer network, for secure multiparty communications comprising:
a plurality of processors, wherein each of the plurality of processors are programmed to receive a secret input state and one or more tuples indicating a sequence of decomposed bits, wherein the tuples are pre-computing during an offline phase;
mask the secret input state with the one or more tuples to compute a masked input;
compute six multiplications on the masked input;
compute multiplication of two secret values to output an intermediate output;
mask a third secret value from the intermediate output and reveal the third secret value to compute an interaction;
compute a multiparty-computation multiplication with the interaction; and
output a final secret value in response to computing the multiparty-computation multiplication.

16. The method of claim 15, wherein the multiparty-computation multiplication includes Secure Multiparty Computation (SPDZ) multiplication .

17. The method of claim 15, wherein the masked input removes a bit decomposition on a secret value in response to masking the secret input state.

18. The method of claim 15, wherein the method includes utilizing a reveal to compute the masked input.

19. The method of claim 15, wherein the method further includes performing an inverse advanced encryption standard cryptography.

* * * * *